United States Patent [19]

Cipkowski

[11] 4,153,169

[45] May 8, 1979

[54] LOADING-UNLOADING CAPABILITY FOR CARGO BOX TRANSPORT VEHICLE

[75] Inventor: Jerome T. Cipkowski, Warren, Mich.

[73] Assignee: The United States of America as represented by the Secretary of the Army, Washington, D.C.

[21] Appl. No.: 903,432

[22] Filed: May 8, 1978

[51] Int. Cl.² .............................................. B60P 1/00
[52] U.S. Cl. .................................... 414/442; 414/546; 414/469
[58] Field of Search ..................... 214/515, 517, 77 R, 214/358

[56] References Cited

U.S. PATENT DOCUMENTS 1,052,096  2/1913  Schulze ............................. 214/77 R
4,019,642  4/1977  Hammar ........................... 214/77 R

FOREIGN PATENT DOCUMENTS 2231601  12/1974  France .................................... 214/515

Primary Examiner—Francis S. Husar
Assistant Examiner—Edmond G. Rishell, Jr.
Attorney, Agent, or Firm—Peter A. Taucher; John E. McRae; Nathan Edelberg

[57] ABSTRACT

Containerized freight is loaded onto a vehicle by attaching an elongated tripod frame to one end of the freight container, applying a lift force to the other end of the container to reposition the container above the plane of the bed on the vehicle, backing the vehicle into the space beneath the container, and lowering the container onto the vehicle bed for transport to another location.

5 Claims, 5 Drawing Figures

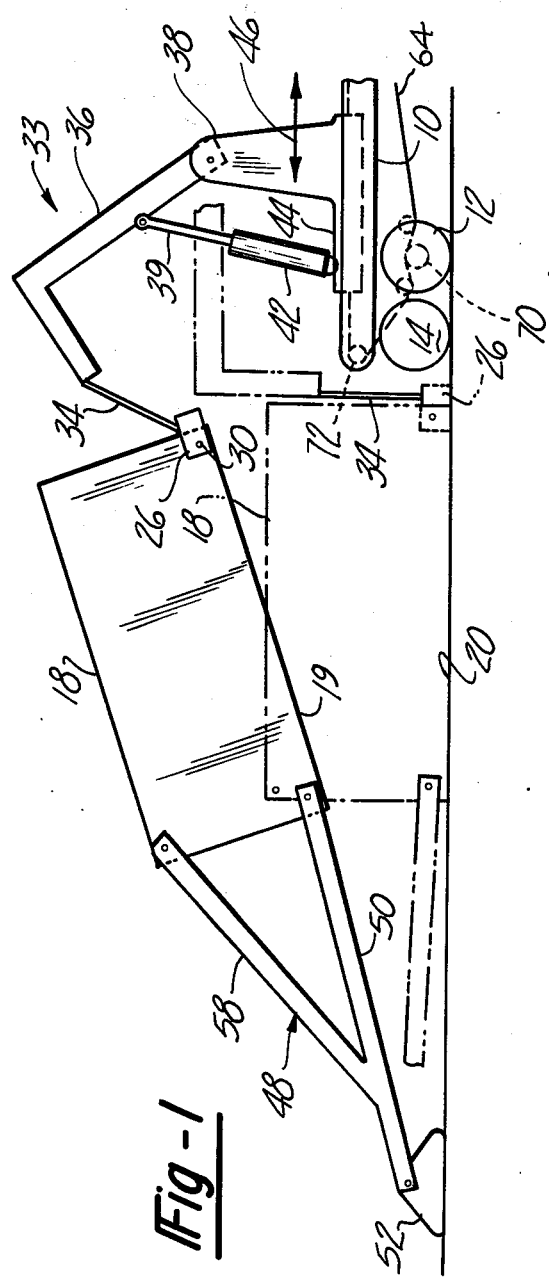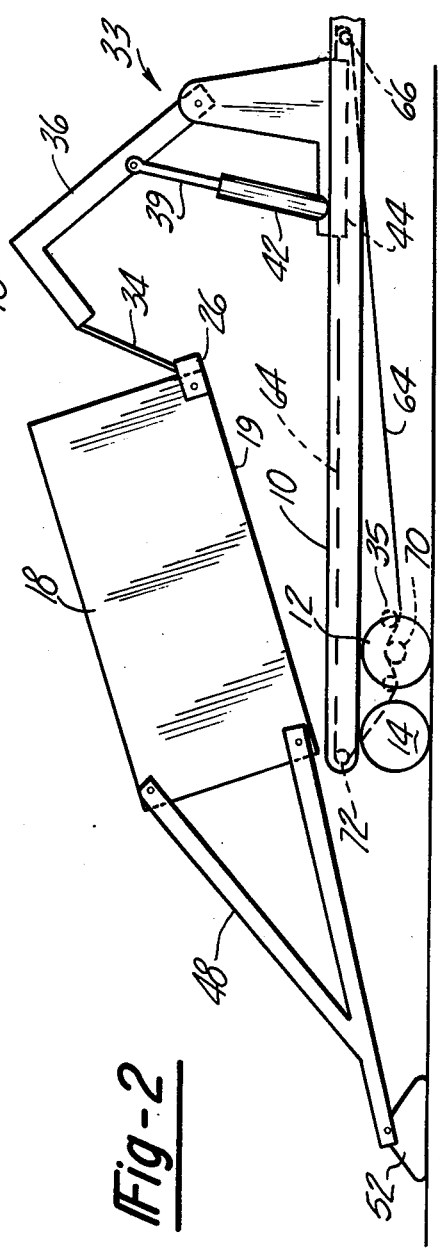

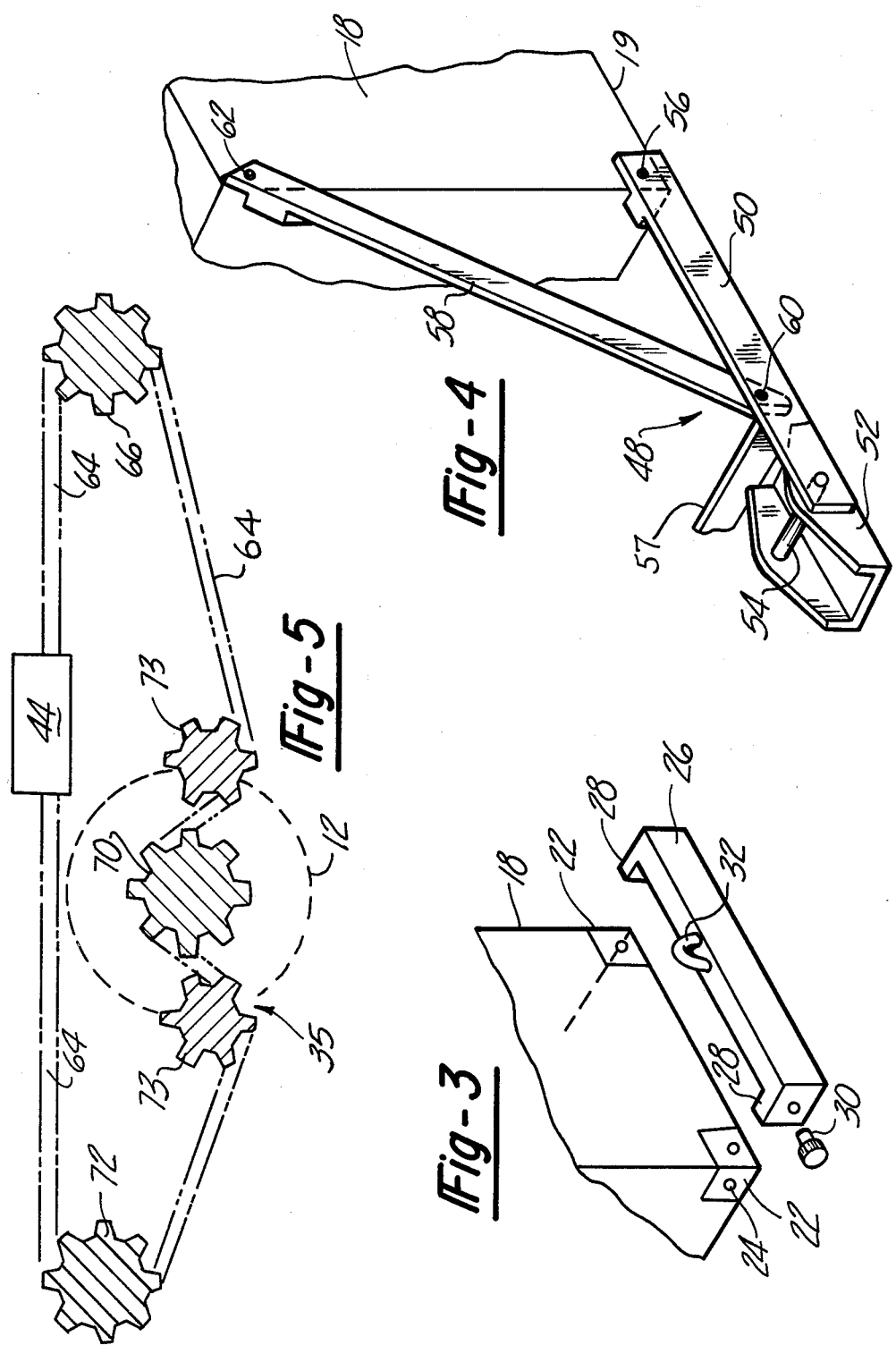

LOADING-UNLOADING CAPABILITY FOR CARGO BOX TRANSPORT VEHICLE

The invention described herein may be manufactured, used and licensed by or for the United States Government for governmental purposes without payment to me of any royalty thereon.

BACKGROUND AND SUMMARY OF THE INVENTION

Cargo items are often transported as containerized units in rectangular closed boxes measuring twenty feet long, eight feet wide, and eight feet high. Weight of a loaded cargo box can approach twenty tons. The present invention is directed to a transport vehicle of the truck or tractor-trailer type, having self-contained mechanism for loading large cargo boxes onto the vehicle bed (platform) at the point of departure, (e.g. a military depot or embarkation point) and unloading the boxes at the point of destination (e.g. a military field headquarters or troop staging area).

Vehicles of this general type are already known in the art; see for example U.S. Pat. Nos. 3,107,021 and 3,892,323. In some already known vehicles the cargo box is loaded onto the vehicle by backing the vehicle into a stationary position aligned with the box, lifting the front end of the box so that the box assumes a tilted position behind the vehicle, dragging the box forwardly over the rear edge of the vehicle platform, and tilting the box downwardly to a prone position on the vehicle platform.

The present invention is a departure from known practice in that the box is not dragged forwardly onto the platform of the vehicle; instead the front portion of the box is lifted upwardly, after which the vehicle is moved rearwardly so that the platform underlies the box; thereafter the box is tilted downwardly about its rest point on the platform so that the box assumes a prone position supported on the vehicle. The principle advantage of this arrangement is that the box does not have to be dragged onto the vehicle; wear and tear on the box is reduced. Also, the power mechanisms for handling the box need not be quite as powerful as with prior art arrangements because the box need only be tilted, not moved bodily along the ground during the initial box-loading step. Similar advantages are obtained during the box-unloading operation.

The mechanism of this invention is preferably designed to accomplish both loading of the box onto the vehicle platform (bed) and unloading of the box from the vehicle platform. The mechanism is particularly intended for use with military transport trucks or trailers adapted to go into remote areas where external loading-unloading equipment is not present or available.

THE DRAWINGS

FIGS. 1 and 2 are side elevational views of a loader-unloader mechanism constructed according to this invention. The FIGS. illustrate the mechanism in various stages of a box-loading operation.

FIG. 3 shows as fragmentary exploded view of a spreader bar and a box.

FIG. 4 shows a portion of the framework and one side area of the box.

FIG. 5 shows a carrier drive mechanism.

FIG. 1 shows in side elevation the rear portion of a bed or platform 10 forming part of a conventional flatbed truck or trailer equipped with ground-engagement wheels 12 and 14. Beyond the rear end of bed 10 there is shown a conventional freight container box 18 and support framework 48. The box-framework assembly is shown in two alternate positions, namely a prone position resting on ground surface 20, and a raised position elevated above the plane of bed 10.

Box 18 is preferably a conventional cargo-carrying box measuring approximately twenty feet in length, eight feet high, and eight feet wide (dimension normal to the paper in FIG. 1). The box, as conventionally constructed, is built with reinforced metal corners 22 (see FIG. 3. Such reinforced corners are formed with slot-like openings 24 adapted to receive hoisting or pulling mechanisms for moving the box between a ground-level position and a transport position on the vehicle platform.

FIG. 4 illustrates the general nature of framework 48 at one side area of the box; the framework mechanism at the other side area of the box would be a duplicate of that shown in FIG. 4. As shown, the framework comprises a first bar 50 extending rearwardly from a lower corner of the box generally parallel to the box lower edge 19. A channel-shaped footplate 52 is pivotally attached to the rear end of bar 50 by means of a heavy pin 54 which defines a fulcrum point during lifting. A pin 56 is driven through the front end of bar 50 into the reinforced corner of the box. Bar 50 is prevented from pivotal displacement about pin 56 by means of a reinforcing brace bar 58 extending diagonally downward from the upper rear corner of box 18 to a bolt-like connection 60 with bar 50. A pin 62 may be driven through the upper end of bar 58 into the reinforced corner of the box to provide a rigid box-bar connection. Disassembly of framework 48 may be accomplished by removing pins 56, 60 and 62. The illustrated framework 48 may be connected to the other similar framework by means of a tie rod or bar 57.

When framework 48 is attached to box 18 (as shown in FIGS. 1 and 2) the effective length of the box is increased by approximately the length of bars 50; preferably each bar 50 is at least one half as long as box 18, e.g. ten foot. The artificially lengthened box may be raised from the FIG. 1 dashed line position to the FIG. 1 full line position by operation of a lifter mechanism 33. Thereafter the vehicle platform 10 may be moved rearwardly (to the left) to position itself underneath the front portion of the box, as shown in FIG. 2. This rearward motion of platform 10 is accomplished as a conventional back-up action of the vehicle, i.e. by putting the engine transmission in reverse gear.

Lifter mechanism 33 includes a fluid cylinder 42 that is trained between a horizontally movable carriage 44 and a lifter lever 36. The carriage preferably is equipped with non-illustrated rollers at its side edges that move within tracks carried on the vehicle bed 10, whereby the carriage can be moved along the longitudinal axis of the vehicle, as designated by numeral 46. The carriage remains motionless when cylinder 42 is energized to raise (or lower) the freight container box 18.

The box lifter mechanism connects to a spreader bar 26 (FIG. 3) having flanges 28 at its ends for positionment outside the box lower front corners. Pins 30 may be extended through openings in the spreader bar flanges and into openings 24 in the reinforced corners of the box to rigidly connect the spreader bar to the box. A lifting eye 32 may be provided at the midpoint of bar 26 for connection to one end of a cable or chain 34 (see FIG. 1) forming part of the lifting mechanism designated generally by numeral 33.

It will be seen from FIG. 1 that when pressure fluid is admitted to the lower end of cylinder 42 the piston rod 39 moves upwardly to cause lever 36 to lift cargo box 18 into a tilted position raised above ground surface 20. The box can be raised a relatively great distance if it has an increased length. In order to artificially increase the box length there is attached to the box the aforementioned triangular framework designated generally by numeral 48. This framework is only connected to the box during and preparatory to loading the box onto platform 10 (or unloading the box from platform 10). At other times framework 48 is detached from the box and broken into its component parts for storage on the truck or trailer.

After box 18 has been raised to its FIG. 1 full line position the vehicle is backed up to position bed 10 underneath the box, as shown in FIG. 2; this operation is accomplished by pulling the vehicle transmission in reverse gear. During reverse motion of platform 10 it is intended that carriage 44 will maintain its position in space, i.e. the carriage will be motionless.

Preferably a mechanical device is incorporated within the vehicle to keep the carriage motionless during the vehicle back-up period. One particular mechanism for accomplishing this result is schematically shown in FIG. 5; the mechanism is designated generally by numeral 35. Mechanism 35 is a force-transmitter that uses the motion of the rear wheels to drive carriage 44 to the right at the same rate that the platform 10 moves to the left. In the arrangement shown in the drawings drive mechanism 35 comprises a sprocket-chain assembly mechanically connected between ground wheel 12 and carriage 44.

Referring to FIG. 5, the drive mechanism is shown to include a chain 64 extending forwardly from carriage 44 around an idler sprocket 66 on platform 10, thence rearwardly across a drive sprocket 70 located on the same axis as ground wheel 12. The chain then extends around an idler sprocket 72 suitably mounted on the underside of platform 10 near its rear end. The chain or cable extends forwardly from sprocket 72 to an anchorage on carriage 44. Idler sprockets 73 may be provided to increase the circumferential contact of drive sprocket 70 on the chain. A disengageable clutch and speed increaser gear box (not shown) are provided between ground wheel 12 and sprocket 70. Assuming the clutch is in an engaged condition, counterclockwise motion of ground wheel 12 (incident to rearward movement of vehicle platform 10) produces a forward movement of carriage 44. If the speed increaser gear box has the correct ratio the carriage 44 will move forward at the same rate as the platform is moving backward; the absolute motion of carriage 44 will be zero.

When bed 10 reaches the FIG. 2 position the fluid cylinder 42 may be de-energized to lower box 18 onto bed 10 for transport to a remote destination. Before the vehicle is driven away framework 48 is disconnected from box 18. On arrival of the vehicle at the destination point framework 48 may be reassembled onto box 18, and the sequence of operations repeated in reverse order to relocate the box from the FIG. 2 condition to the FIG. 1 unloaded condition.

I wish it to be understood that I do not desire to be limited to the exact details of construction shown and described for obvious modifications will occur to a person skilled in the art.

I Claim:

1. In a self-loading vehicle for transporting a multi-ton cargo box: the improvement comprising an elongated horizontal vehicle platform (10) having front and rear ends with a longitudinal axis extending therebetween; ground wheels (12,14) at the platform rear end for supporting said platform above ground level; a carriage (44) movable on said platform along its longitudinal front-to-rear axis; powered lifter mechanism (33) mounted on said carriage; connector means (26) carried by the lifter mechanism for detachable engagement with the lower front corners of the box when said box is resting at ground level directly behind the platform; said lifter mechanism being energizable to lift the front portion of the box upwardly so that the box is above the plane of the support platform; and means (35) responsive to movement of the platform in a rearward direction for causing the carriage to remain substantially motionless in space while the platform is undergoing such rearward movement, whereby the platform takes a position underlying the box.

2. The improvement of claim 1, and further comprising a framework (48) rigidly attachable to the rear end of the box, said framework including a foot structure (52) that forms a terrain-engaged fulcrum point while the box is being lifted.

3. The improvement of claim 2, wherein the framework has a length that is at least one half the length of the box, whereby the foot structure is positioned a considerable distance behind the box.

4. The improvement of claim 1: said responsive means (35) comprising sprocket means driven by a ground wheel means (12) and a cooperating chain means connected to the carriage.

5. The improvement of claim 4: said responsive means (35) comprising a disengageable clutch means interposed between the ground wheel means and the sprocket means, whereby when said clutch means is disengaged the vehicle may be driven overland without producing relative motion between the carriage and platform.

* * * * *